United States Patent
Bax et al.

(10) Patent No.: US 10,630,164 B1
(45) Date of Patent: Apr. 21, 2020

(54) GENERATOR SYSTEMS

(71) Applicant: Hamilton Sundstrand Corporation, Charlotte, NC (US)

(72) Inventors: Randall Bax, Rockton, IL (US); Dwight D. Schmitt, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/271,348

(22) Filed: Feb. 8, 2019

(51) Int. Cl.
| | |
|---|---|
| *H02M 1/12* | (2006.01) |
| *H02M 5/458* | (2006.01) |
| *H02P 9/02* | (2006.01) |
| *H02M 1/44* | (2007.01) |

(52) U.S. Cl.
CPC ............ *H02M 1/126* (2013.01); *H02M 1/44* (2013.01); *H02M 5/458* (2013.01); *H02P 9/02* (2013.01); *H02P 2201/01* (2013.01)

(58) Field of Classification Search
CPC .......... H02M 1/126; H02M 1/44; H02M 5/40; H02M 5/42; H02M 5/44; H02M 5/458; H02P 9/02; H02P 2201/01
See application file for complete search history.

(56) References Cited

U.S. PATENT DOCUMENTS

| | | | |
|---|---|---|---|
| 4,912,618 A * | 3/1990 | Krinickas, Jr. ....... | H01F 27/303 363/37 |
| 4,935,859 A | 6/1990 | Kirchberg et al. | |
| 5,043,857 A | 8/1991 | Kirchberg, Jr. et al. | |
| 5,383,107 A | 1/1995 | Hopkins et al. | |
| 5,438,502 A | 8/1995 | Rozman et al. | |
| 6,134,127 A | 10/2000 | Kirchberg | |
| 10,003,186 B2 | 6/2018 | Wagner et al. | |
| 2007/0139985 A1* | 6/2007 | Bax ...................... | H01H 83/226 363/106 |
| 2011/0141783 A1* | 6/2011 | Murali Dora ........... | H02J 9/062 363/127 |
| 2014/0159504 A1* | 6/2014 | Vogt ........................ | H02J 3/383 307/109 |
| 2016/0268923 A1* | 9/2016 | Bremicker ............... | H02M 1/12 |
| 2018/0205314 A1* | 7/2018 | Bleus .................. | H05K 7/20909 |

* cited by examiner

*Primary Examiner* — Matthew V Nguyen
(74) *Attorney, Agent, or Firm* — Locke Lord LLP; Daniel J. Fiorello; Scott D. Wofsy

(57) ABSTRACT

A generator system can include a generator configured to output an alternating current (AC) generator output, a rectifier operatively connected to the generator and configured convert the AC generator output into a direct current (DC) rectifier output, and a four wire inverter operatively connected to the rectifier to receive the DC rectifier output, the four wire inverter configured to convert the DC rectifier output into 3 phase AC inverter output, wherein the four wire inverter can include three output wires, each output wire configured to output a respective phase of the 3 phase AC, wherein the four wire inverter can include a fourth neutral wire for providing a neutral path.

9 Claims, 3 Drawing Sheets

GENERATOR SYSTEMS

BACKGROUND

1. Field

This disclosure relates to generator systems, e.g., for aircraft.

2. Description of Related Art

Existing generator systems, e.g., for aircraft, utilize a neutral forming transformer (NFT) to for the creation of a neutral connection. As the NFT is a magnetic component, it is heavy. The NFT may also be configured to be exposed to harmonic current for non-linear loads, which adds additional weight.

Such conventional methods and systems have generally been considered satisfactory for their intended purpose. However, there is still a need in the art for improved generator systems. The present disclosure provides a solution for this need.

SUMMARY

A generator system can include a generator configured to output an alternating current (AC) generator output, a rectifier operatively connected to the generator and configured convert the AC generator output into a direct current (DC) rectifier output, and a four wire inverter operatively connected to the rectifier to receive the DC rectifier output, the four wire inverter configured to convert the DC rectifier output into 3 phase AC inverter output, wherein the four wire inverter can include three output wires, each output wire configured to output a respective phase of the 3 phase AC, wherein the four wire inverter can include a fourth neutral wire for providing a neutral path. In certain embodiments, the system does not include a neutral forming transformer.

The system can include one or more filters in electrical communication with the inverter. The one or more filters can include at least one of a common mode filter or a differential mode filter. The common mode filter can be disposed downstream of the inverter. In certain embodiments, however, the common mode filter can be disposed upstream of the inverter. In certain embodiments, the common mode filter is disposed between the rectifier and the inverter.

The differential mode filter can be disposed downstream of the inverter. The inverter can be operatively connected to a high intensity radiated field (HIRF) module downstream of the one or more filters. The system can include a DC link disposed between the rectifier and the inverter to smooth the DC rectifier output that is received by the inverter. Any other suitable electrical components for any suitable purpose and in any suitable location of the system are contemplated herein.

In certain embodiments, the system can include an inverter control module configured to control the four wire inverter to output 3 phase AC inverter output on the three output wires, and to provide the neutral path on the neutral wire. The four wire inverter can be a neutral point clamping inverter, for example, or any other suitable 4 wire inverter.

In accordance with at least one aspect of this disclosure, an aircraft generator system having a four wire output without a neutral forming transformer can include any suitable generator disclosed herein (e.g., described above), e.g., and may not have a neutral forming transformer. In certain embodiments, all components of the system can be floating (e.g., such that none are connected to ground until after output from the system). Any other suitable configuration is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
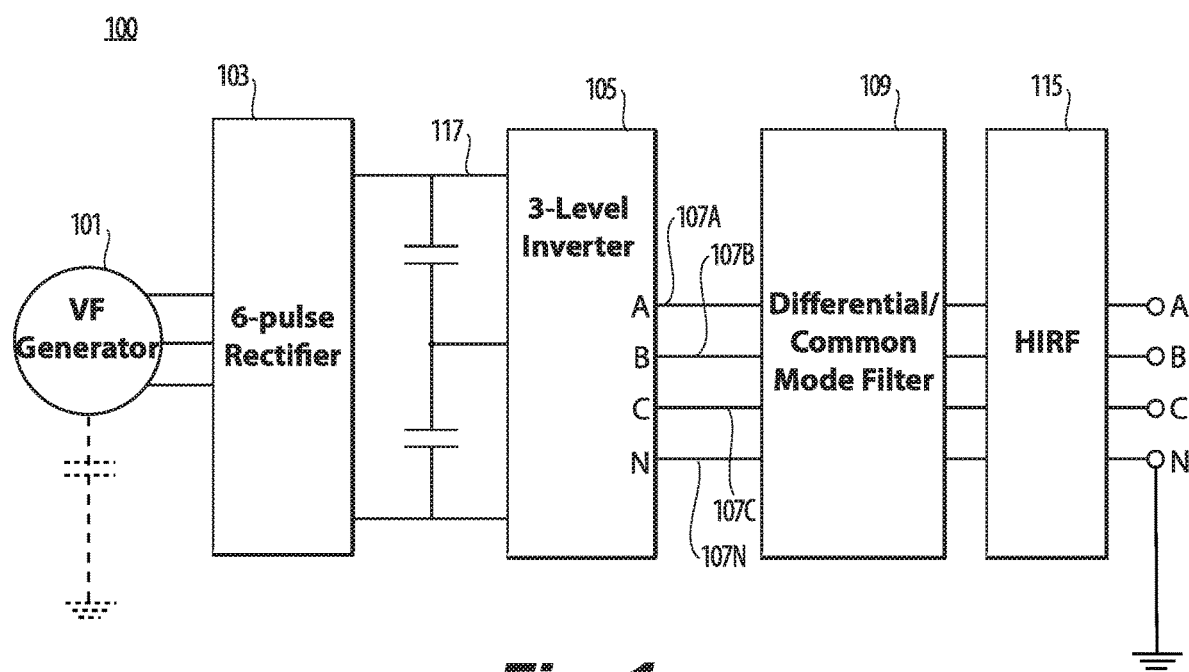
FIG. 1 is a schematic block diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3.

Figure 2:
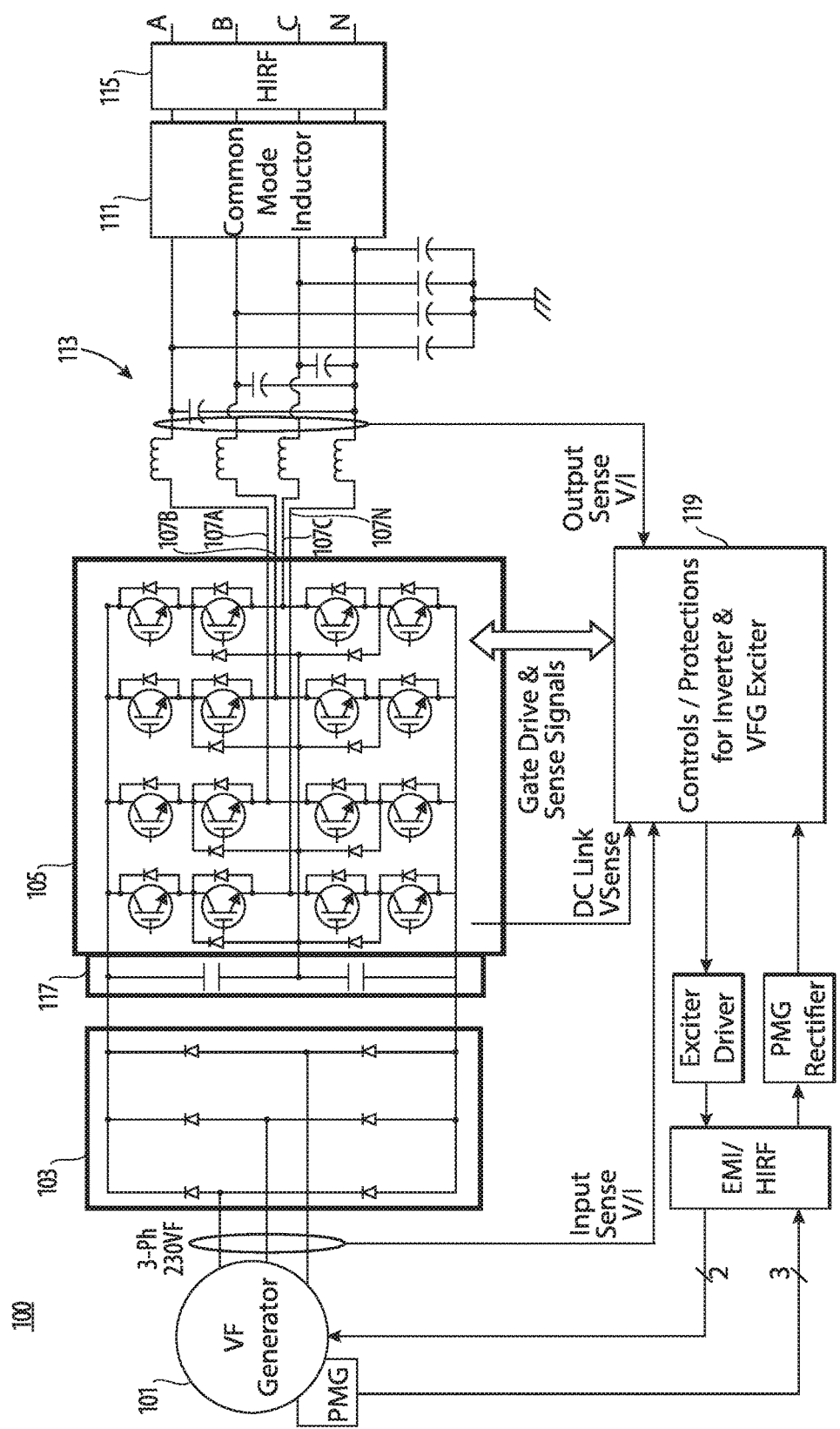
FIG. 2 is an schematic circuit diagram of the embodiment of FIG. 1.
Figure 3:
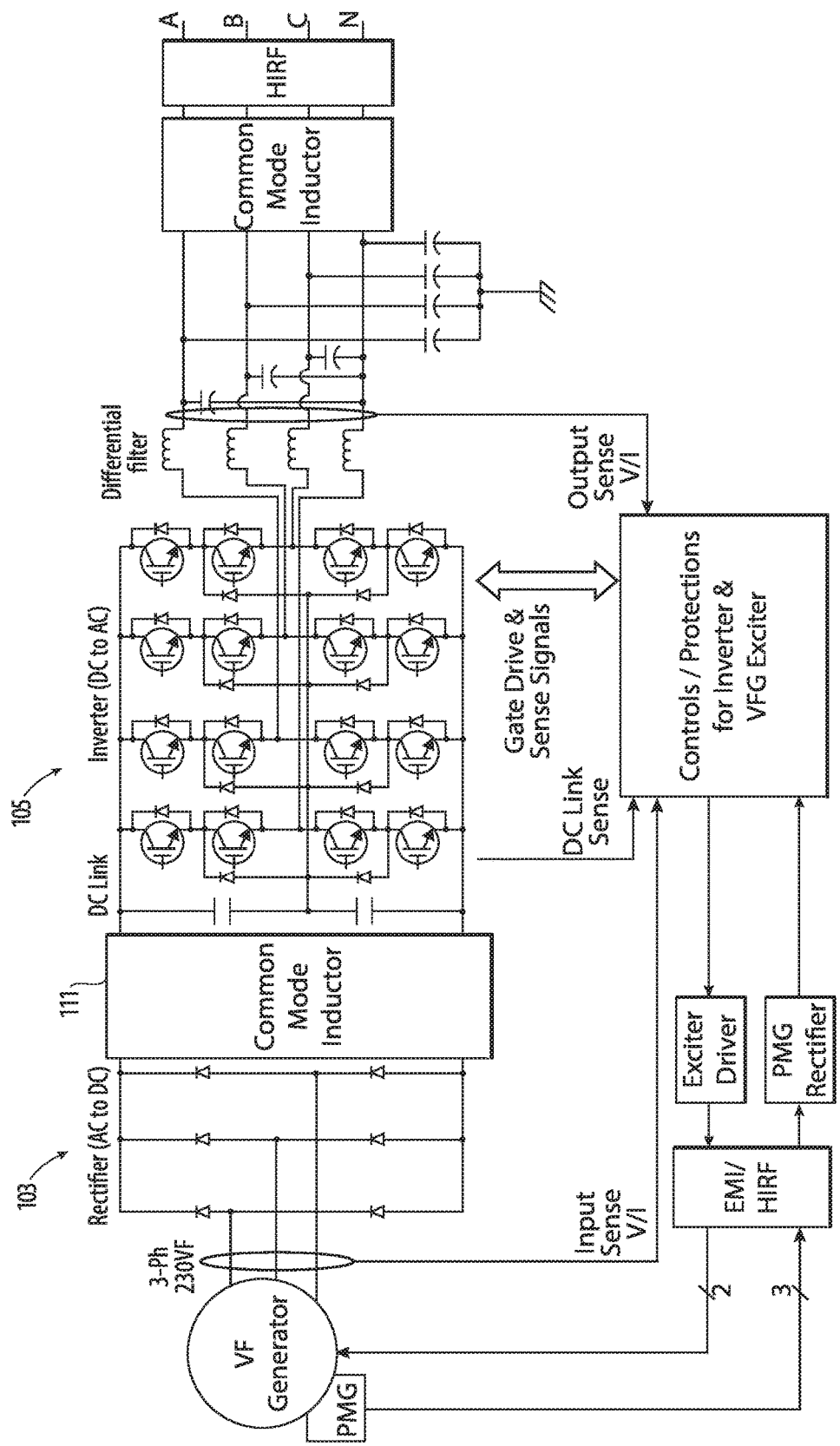
FIG. 3 is a schematic circuit diagram of another embodiment of a system in accordance with this disclosure.

Referring to FIGS. 1 and 2, a generator system 100 can include a generator 101 configured to output an alternating current (AC) generator output. The generator 101 can be any suitable generator type (e.g., wound rotor, permanent magnet, etc.). For example, the generator 101 can be an integrated drive generator (IDG) a variable frequency (VF) generator, or a variable speed constant frequency generator (VSCF). The generator 101 can be connected to an engine (e.g., an aircraft engine), and operate at any suitable speed (e.g., over 1000 HZ or any other suitable frequency).

The system 100 can include a rectifier 103 operatively connected to the generator 101 and configured convert the AC generator output into a direct current (DC) rectifier output. The rectifier 103 can be a 6-pulse rectifier, 12-pulse rectifier, an active rectifier, or any other suitable rectifier type.

The system 100 can include a four wire inverter 105 operatively connected to the rectifier 103 to receive the DC rectifier output (e.g., directly or indirectly). The four wire inverter 105 can be configured to convert the DC rectifier output into 3 phase AC inverter output. The four wire inverter 105 can be a 3-level inverter, or any other suitable number of levels. In certain embodiments, all components of the system can be floating (e.g., such that none are connected to ground until after output from the system).

The four wire inverter 105 can include three output wires 107A, B, C, each output wire 107A, B, C configured to output a respective phase of the 3 phase AC invertor output. The four wire inverter 105 can include a fourth neutral wire 107N for providing a neutral path. In certain embodiments, e.g., as shown, the system 100 does not include a neutral forming transformer as it does not need one since the 4 wire inverter creates the neutral wire 107N.

The system 100 can include one or more filters 109 in electrical communication with the inverter 105, e.g., via the four wires 107A, B, C, N. Referring to FIG. 2, the one or more filters 109 can include at least one of a common mode filter 111 or a differential mode filter 113. As shown in FIG. 2, the common mode filter 111 can be disposed downstream of the inverter 105. In certain embodiments, however, e.g., as shown in FIG. 3, the common mode filter 111 can be disposed upstream of the inverter 105 (e.g., on the DC side, which can make the system 100 less weight when the generator is not locally near the converter). In certain embodiments, e.g., as shown in FIG. 3, the common mode filter 111 can be disposed between the rectifier 103 and the inverter 105. Any other suitable location for the common mode filter 111 is contemplated herein.

In certain embodiments, e.g., as shown, the generator 101, DC link 117, and the inverter 105 are all not connected to chassis and are floating. In such embodiments, this forces the common mode currents, generated by the power electronic to circulate from the output filter through chassis to the parasitic capacitance of the generator 101. Floating these components and/or any other suitable components reduces the overall common mode filtering needs of the system.

The differential mode filter 113 can be disposed downstream of the inverter 105. The differential mode filter 113 can be configured to smooth the output from the inverter 105. Any other suitable location is contemplated herein.

In certain embodiments, the inverter 105 can be operatively connected to a high intensity radiated field (HIRF) module 115 downstream of the one or more filters 109, e.g., to protect the system from any high intensity radiation (e.g., from a lightning strike). The system 100 can include a DC link 117 disposed between the rectifier 103 and the inverter 105 to smooth the DC rectifier output that is received by the inverter 105. Any other suitable electrical components for any suitable purpose and in any suitable location of the system 100 are contemplated herein.

In certain embodiments, as shown in FIGS. 2 and 3, the system 100 can include an inverter control module 119 configured to control the four wire inverter 105 to output 3 phase AC inverter output (e.g., sinusoidal) on the three output wires 107A, B, C, and to provide the neutral path on the neutral wire 107N. The four wire inverter 105 can be a neutral point clamping (NPC) inverter, for example, or any other suitable 4 wire inverter (e.g., a T-type). The inverter control module 119 can be configured to utilize a fourth neutral wire 107N to balance the midpoint (connection between capacitors), reduce common mode voltages that will additionally reduce unwanted harmonics.

In accordance with at least one aspect of this disclosure, an aircraft generator system having a four wire output without a neutral forming transformer can include any suitable generator disclosed herein (e.g., described above), e.g., and may not have a neutral forming transformer. Any other suitable configuration is contemplated herein Current implementation for neutral generation utilize a 2-level (3-wire) inverter with a transformer connection to neutral. Differential filtering after the inverter smooths the PWM waveform before connection to the NFT. Additional filtering is applied after the NFAT to meet power quality standards. Additionally the 2-level inverter harmonic content effects the weight of the filtering components. The NFT functionally similar to a autotransformer in that the transformer does not have isolation and the normally wye connected. Besides being a heavy component this item needs to be able to sized for neutral currents that occur for unbalance and/or non-linear load types, which adds weight and physical size.

Embodiments disclosed above, however, disclose one or more alternative ways to create the neutral line that is lighter, for example. Embodiments, utilize a 3-level, four wire inverter. This can allow removal of the NFT and certain additional filtering. Embodiments are smaller, lighter, and/or easier to package. Also, in certain embodiments, the DC link midpoint is not tied to chassis as appreciated by those having ordinary skill in the art in view of this disclosure, which can provide a different wave shape which allows a reduction in harmonics.

Embodiments provide weight reduction and an efficiency improvement of approximately 2% or more. Embodiments allow the common mode filter inductor location to be optimized for additional weight savings if the application warrants, and the ungrounded generator system reduces common mode filter size. Embodiments allow floating all components of the system which reduces the amount of filtering needed, which reduces weight. Embodiments that are floating have no internal connection of the electrical components or circuit throughout the product to ground until the output filter caps or neutral is connected to ground on the aircraft. The patristic capacitance is part of the overall circuit (this capacitance is not a real component but an artifact of the design of the generator.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator system, comprising:
   a generator configured to output an alternating current (AC) generator output;
   a rectifier operatively connected to the generator and configured convert the AC generator output into a direct current (DC) rectifier output; and
   a four wire inverter operatively connected to the rectifier to receive the DC rectifier output, the four wire inverter configured to convert the DC rectifier output into 3 phase AC inverter output, wherein the four wire inverter includes three output wires, each output wire configured to output a respective phase of the 3 phase AC, wherein the four wire inverter includes a fourth neutral wire for providing a neutral path, wherein the system includes one or more filters in electrical communication with the inverter, wherein the one or more filters include at least one of a common mode filter or a differential mode filter, wherein the common mode filter is disposed upstream of the inverter, wherein the common mode filter is disposed between the rectifier and the inverter.

2. The system of claim 1, wherein the system does not include a neutral forming transformer.

3. The system of claim 1, wherein the differential mode filter is disposed downstream of the inverter.

4. The system of claim 1, wherein the inverter is operatively connected to a high intensity radiated field (HIRF) module downstream of the one or more filters.

5. The system of claim 1, further comprising a DC link disposed between the rectifier and the inverter to smooth the DC rectifier output that is received by the inverter.

6. The system of claim 1, further comprising an inverter control module configured to control the four wire inverter to output 3 phase AC inverter output on the three output wires, and to provide the neutral path on the neutral wire.

7. The system of claim 1, wherein the four wire inverter is a neutral point clamping inverter.

8. An aircraft generator system having a four wire output without a neutral forming transformer, comprising:
   a generator configured to output an alternating current (AC) generator output;
   a rectifier operatively connected to the generator and configured convert the AC generator output into a direct current (DC) rectifier output; and
   a four wire inverter operatively connected to the rectifier to receive the DC rectifier output, the four wire inverter configured to convert the DC rectifier output into 3 phase AC inverter output, wherein the four wire inverter includes three output wires, each output wire configured to output a respective phase of the 3 phase AC, wherein the four wire inverter includes a fourth neutral wire for providing a neutral path, wherein the system includes one or more filters in electrical communication with the inverter, wherein the one or more filters include at least one of a common mode filter or a differential mode filter, wherein the common mode filter is disposed upstream of the inverter, wherein the common mode filter is disposed between the rectifier and the inverter.

9. The system of claim 8, wherein all components of the system are floating.

\* \* \* \* \*